(12) United States Patent
Lu et al.

(10) Patent No.: US 6,760,574 B1
(45) Date of Patent: Jul. 6, 2004

(54) TWO-DIMENSIONAL SIGNAL DETECTOR WITH DYNAMIC TIMING PHASE COMPENSATION

(75) Inventors: Cheng-Youn Lu, Cresskill, NJ (US); Judith Wang, Sunnyvale, CA (US)

(73) Assignee: Centillium Communications, Inc., Fremont, CA (US)

( * ) Notice: Subject to any disclaimer, the term of this patent is extended or adjusted under 35 U.S.C. 154(b) by 651 days.

(21) Appl. No.: 09/837,856

(22) Filed: Apr. 17, 2001

(51) Int. Cl.[7] ............................................. H04B 17/00
(52) U.S. Cl. ................... 455/226.1; 455/502; 455/557; 455/73; 375/354; 375/355
(58) Field of Search ................. 455/73, 557, 114.2, 455/502, 501, 63.1, 67.13, 570, 277.2, 278.1, 296, 226.1; 370/503, 498, 509, 510–514; 375/354, 355, 357, 359, 219, 222

(56) References Cited

U.S. PATENT DOCUMENTS

| | | | | |
|---|---|---|---|---|
| 5,483,538 A | * | 1/1996 | Rainbolt | 370/509 |
| 5,909,463 A | * | 6/1999 | Johnson et al. | 375/220 |
| 5,995,568 A | * | 11/1999 | Molnar et al. | 375/354 |
| 6,009,132 A | * | 12/1999 | Scholtz | 375/355 |
| 6,101,230 A | * | 8/2000 | Chun et al. | 375/355 |
| 6,249,557 B1 | * | 6/2001 | Takatori et al. | 375/355 |
| 6,341,148 B1 | * | 1/2002 | Girardeau, Jr. | 375/355 |
| 6,353,636 B1 | * | 3/2002 | Tate et al. | 375/260 |
| 6,628,738 B1 | * | 9/2003 | Peeters et al. | 375/371 |
| 6,707,868 B1 | * | 3/2004 | Camagna et al. | 375/371 |

* cited by examiner

*Primary Examiner*—Sonny Trinh
(74) *Attorney, Agent, or Firm*—Fenwick & West LLP

(57) ABSTRACT

A method for detecting an input signal at a transceiver of a communication system is disclosed, and includes compensating for timing misalignment between when the receipt of the input signal was indicated and when the input signal actually arrived. A signal detector for detecting an input signal and adapted to compensate for timing misalignment is also disclosed.

28 Claims, 8 Drawing Sheets

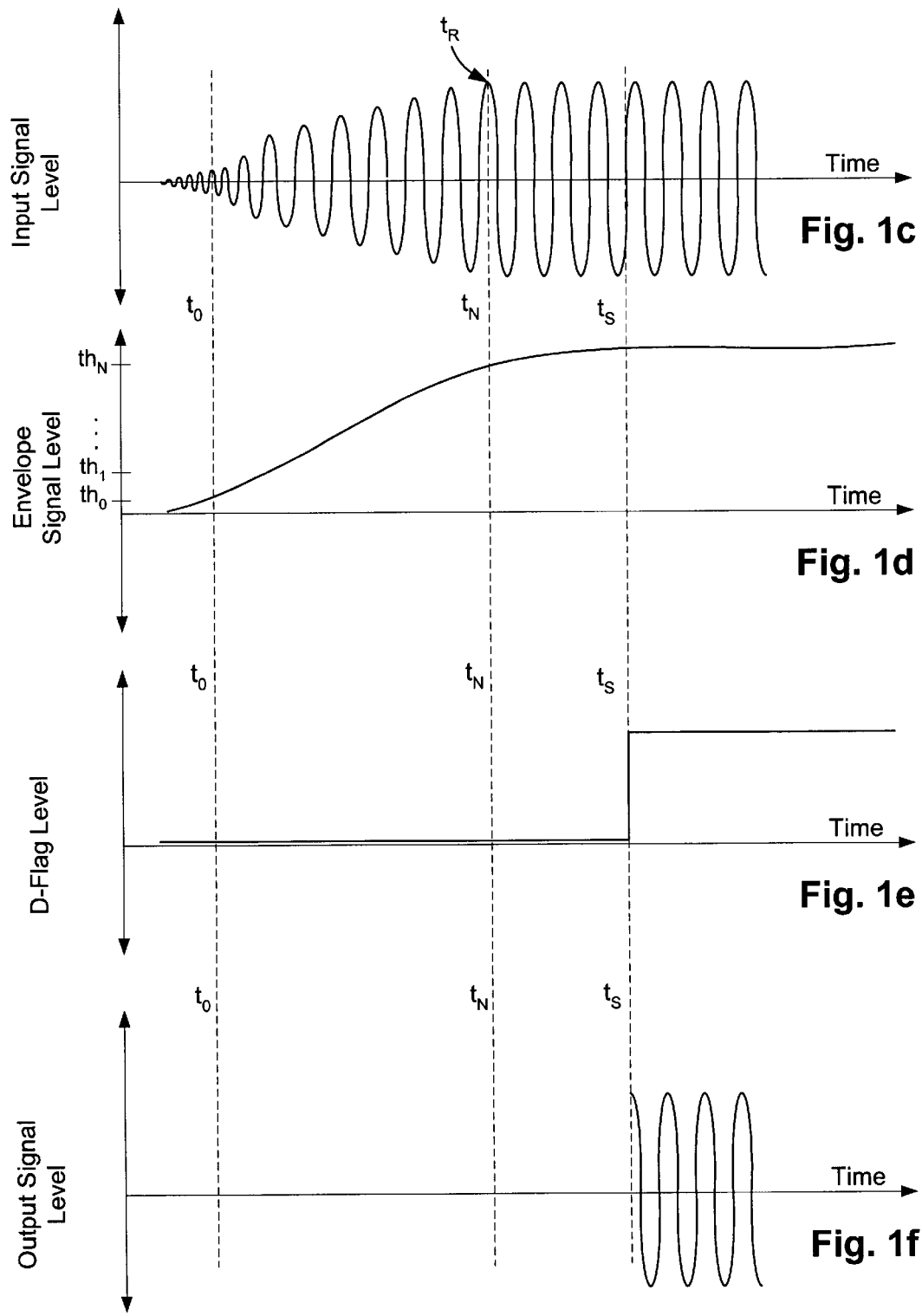

TWO-DIMENSIONAL SIGNAL DETECTOR WITH DYNAMIC TIMING PHASE COMPENSATION

FIELD OF THE INVENTION

This invention relates generally to signal detection, and in particular to a two-dimensional signal detector with dynamic compensation for broadband data network applications.

BACKGROUND OF THE INVENTION

A conventional telephone transmission line is typically comprised of a pair of copper conductors that connect a telephone set to the nearest central office, digital loop carrier equipment, remote switching unit or any other equipment serving as the extension of the services provided by the central office. This pair of copper conductors, which is also referred to as a twisted pair, has its leads named as tip and ring. The tip and ring nomenclature is derived from the electrical contacts of an old-style telephone plug. A number of such twisted pairs are generally bundled together within the same cable binder group.

The demand for high bandwidth data transmission over existing telephone transmission lines has led to the development of digital subscriber line (DSL) technology. Several variations of DSL technology (referred to generically as xDSL or simply DSL) are evolving, such as SHDSL (symmetric high-bit-rate DSL), HDSL2 (second-generation high-bit-rate DSL), RADSL (rate adaptive DSL), VDSL (very high-bit-rate DSL), and ADSL (asymmetric DSL). In general, a digital subscriber line is comprised of two DSL modems coupled to one another by a twisted pair. The transmit (Tx) and receive (Rx) signals of DSL communications are carried by the twisted pair.

One challenge presented by DSL technology (as well as other broadband technology) is detecting signal arrival time accurately under various channel and receiving signal conditions. For example, the power of a received signal may vary over a range of 50 decibels (dB) due to factors such as the loop length of the transmission line. Conventional signal detection mechanisms detect received signals having an amplitude above a single pre-set threshold. There are a number of problems associated with such detection mechanisms. For example, the detection reliability is compromised when the signal being detected has a wide dynamic variation in power. In addition, the detection accuracy is compromised due to timing misalignment between when detection of the signal is indicated and when the signal actually arrives.

Assume, for example, that a broadband network has a five Megabaud data transmission rate with 100 symbols per data packet. Further assume that the duration of a data packet is 20 microseconds. If the signal detection indication is misaligned with the actual signal arrival by two microseconds, the receiver will miss ten data symbols. Such data loss may require retransmission of the associated data packet. Thus, misalignment between when detection of the signal is indicated and when the signal actually arrives can result in degraded system performance.

What is needed, therefore, is a signal detector that is reliable when detecting a signal that has a wide dynamic variation in signal power, and can dynamically correct for timing misalignment to improve detection time accuracy.

SUMMARY OF THE INVENTION

One embodiment of the present invention provides a method for detecting an input signal at a transceiver of a communication system. The method includes characterizing the actual arrival of the input signal by applying the input signal to a number of predetermined sequential threshold levels including a first threshold level. The method further includes noting the effective time at which each predetermined threshold level is crossed by the input signal. The method proceeds with indicating receipt of the input signal after a predetermined settling time, and identifying the last threshold level crossed. The last threshold level is associated with the actual arrival of the input signal. The method further includes compensating for timing misalignment between when the receipt of the input signal was indicated and when the input signal actually arrived.

Another embodiment of the present invention provides a signal detector for detecting an input signal. The signal detector includes a multilevel detector module having a number of predetermined sequential threshold levels including a first threshold level. The multilevel detector module is adapted to indicate each threshold level crossed by the input signal. The detector further includes a control logic module adapted to time-stamp the input signal at each threshold level reached, and to indicate receipt of the input signal upon expiration of a predetermined settling time. The detector also includes a memory for storing consecutive samples of the input signal. Each stored sample corresponds to a specific indexed location of the memory. The detector further includes a computation module adapted to calculate the index specifying the memory location storing the sample of the input signal that is associated with the actual arrival of the input signal.

These and other embodiments are described in more detail in the detailed description of the invention section. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1c illustrates a timing diagram showing a typical communication system input signal.

FIG. 1d illustrates a timing diagram showing the envelope signal of a typical communication system input signal.

FIG. 1e illustrates a timing diagram showing a detection flag signal in accordance with one embodiment of the present invention.

FIG. 1f illustrates a timing diagram showing a time adjusted output signal in accordance with one embodiment of the present invention.

DETAILED DESCRIPTION OF THE INVENTION

Figure 1A:
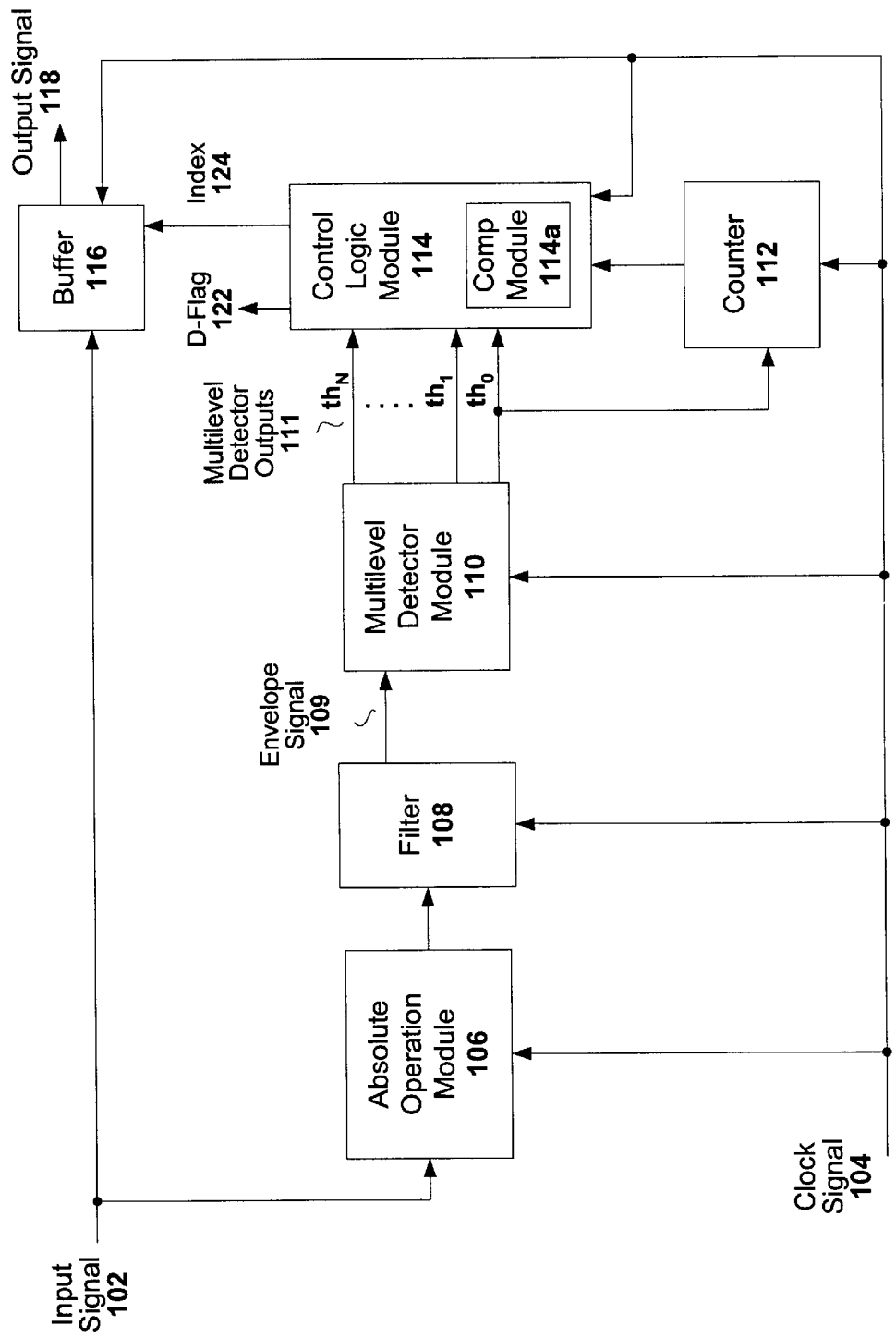
FIG. 1a illustrates a block diagram of a signal detector in accordance with one embodiment of the present invention.

FIG. 1a illustrates a block diagram of a signal detector in accordance with one embodiment of the present invention. The signal detector comprises an absolute operation module 106, a filter 108, a multilevel detector module 110, a counter 112, a control logic module 114, a computation module 114a, and a buffer 116. Note that other embodiments of the signal detector may include modules not shown in the figure (e.g., an analog-to-digital converter, amplifier, isolation transformer). Likewise, other embodiments of the signal detector may not include some of the modules shown (e.g., absolute operation module). The detector components may be implemented in hardware, software, firmware or any combination thereof. For example, each of the components shown in FIG. 1 may be implemented as one or more application specific integrated circuits. Similarly, the functionality of the multilevel detector module 110, counter 112, control logic module 114, computation module 114a, and buffer 116 can be included in a single module or chip set that operates in accordance with the principles of the present invention. Numerous embodiments and configurations will be apparent in light of this disclosure.

General Overview

A digital input signal 102 is provided to the input of absolute operation module 106, and also to the input of buffer 116. The output of absolute operation module 106 is provided to the input of filter 108. The output of filter 108 is the envelope of input signal 102, and is referred to as envelope signal 109. Envelope signal 109 is provided to the input of multilevel detector module 110. The outputs 111 ($th_0$ through $th_N$) of multilevel detector 110 are provided to the corresponding inputs of control logic module 114. Note that output $th_0$ is also provided to counter 112. A signal delay index (Index) 124 computed by control logic module 114 is output to buffer 116. A detection flag (D-Flag) 122 is also output by control logic module 114. Output signal 118 is output by buffer 116. This output signal 118 is the delayed version of input signal 102. In this embodiment, a clock signal 104 synchronizes operation of the components.

Generally, the signal detector employs a two-dimensional detection technique which effects signal analysis in both the signal level domain and the time domain. Envelope signal 109 is filtered or otherwise derived from a received digital input signal 102. The signal level of envelope signal 109 is characterized as it transitions across a number of predetermined threshold levels associated with multilevel detector module 110. Counter 112 acts as a timing mechanism, and starts counting upon the initial predetermined threshold level being reached. The time count at which each crossed threshold level is reached by the transitioning envelope signal 109 is noted. In the embodiment shown, each noted time count is stored in control logic module 114.

Detection flag 122 is set after a predetermined settling time. Generally, the settling time ranges from the time the initial predetermined threshold level was reached to a post-transition time. A delta time count between when the initial threshold level was reached and when the greatest threshold level was reached is calculated. The signal delay index 124 is then calculated by subtracting that delta time count from the predetermined settling time. The resulting signal delay index 124 corresponds to the address of a location in buffer 116. This buffer location stores a sample of the input signal 102 that represents the delayed version of the input signal 102, which is provided as output signal 118. Thus, the timing misalignment between setting of the detection flag 122 and the actual arrival of the input signal 102 is compensated for.

Components

The embodiment shown includes absolute operation module 106, which converts any negative polarities associated with input signal 102 to their positive polarity equivalent. In alternative embodiments, absolute operation module 106 could be implemented as a squaring operation function, or any equivalent circuit or module that produces a positive output (e.g., full wave rectifier function). Alternatively, negative polarities associated with input signal 102 can be ignored (e.g., half wave rectifier function). Ignoring the negative polarities assumes that such polarities (once converted to their positive equivalent) have a negligible impact on the shape of the envelope signal 109.

Filter 108 filters the output of the absolute operation module 106 thereby providing the envelope signal 109. In one embodiment, filter 108 is configured as a bandpass filter having a lower cut-off frequency of approximately 1 Kilohertz (KHz) and an upper cut-off frequency of approximately 1 Megahertz (MHz). Note, however, that the actual passband of filter 108 depends on factors such as the carrier frequency associated with input signal 102 and the type of DSL technology being employed (e.g., ADSL or VDSL).

In alternative embodiments, the functionality of absolute operation module 106 and filter 108 can be effected by a conventional envelope detector that is configured to block DC components associated with input signal 102. Regardless, envelope signal 109 is derived from the digital input signal 102 and is provided to multilevel detector module 110.

Multilevel detector module 110 receives envelope signal 109 and detects signal levels of envelope signal 109 as it transitions across a number of predetermined threshold levels associated with multilevel detector module 110. In one embodiment, multilevel detector module 110 includes a number of comparators, where each comparator has a different trigger threshold thereby allowing the multilevel detector module 110 to effectively characterize the envelope signal 109. For example, eight comparators can be used to detect and characterize an envelope signal 109 having a voltage swing ranging from 0 volt to 1.25 volts. The first comparator (lowest level) in such an embodiment might have a trigger threshold of 0.1 volt, with each successive comparator having a trigger threshold approximately 0.15 volt higher than the previous comparator. The highest level comparator would therefore have a trigger threshold of approximately 1.15 volts. In response to a particular comparator's trigger threshold being reached, the corresponding detector output 111 will be set.

Note that the greater number of comparators employed by multilevel detector module 110, the greater the granularity at which the envelope signal 109 is characterized. Further note that the voltage swing of the envelop signal 109 may vary significantly from one communication system to another. Thus, if a particular detection granularity is desired (e.g., 0.25 volt granularity), the number of comparators required to satisfy the desired granularity will depend on the voltage range of the envelope signal. More specifically, the number of comparators equals the envelope signal voltage range divided by the detection granularity. The result can be truncated thereby providing a whole number specifying the number of required comparators. Generally, the detection granularity can be selected to minimize inefficiency due to data loss, and depends on factors such as the transmission rate, the number of symbols per data packet, and the duration of a the data packet.

Conventional comparator technology may be used to effect the comparators included in multilevel detector module 110. The number of comparators used can vary depends on factors such as the desired detection granularity and the desired system performance. The performance parameters of the comparators such as switching speed and trigger tolerance will depend on factors such as the system clocking speed, the transmission rate, the number of symbols per data packet, and the duration of a the data packet.

Buffer 116 stores samples of the digital input signal 102 to be available for output. In one embodiment, buffer 116 is a ring buffer or other FIFO-based queue structure (e.g., shift register). For example, buffer 116 may be implemented using a block of RAM or flash memory having a consecutive number of address spaces. Each address space can be used to store consecutive samples of input signal 102. Thus, if a analog-to-digital converter (not shown) associated with the detector has a 10 bit resolution, then each address space should be able to store a 10 bit sample. Additionally, buffer 116 should have enough space to store the samples provided during the predetermined settling time. As such, the size of buffer 116 depends on factors such as the sampling rate and resolution of the associated analog-to-digital converter. The appropriate sample of input signal 102 in buffer 116 is selected for output 118 by control logic module 114 (as indicated by index 124).

Counter 112 acts as a timer, and starts counting upon the lowest trigger threshold (sometimes referred to as the initial threshold level) of the multilevel detector module 110 being reached. In response to this event, multilevel detector module 110 outputs $t_1$, which is applied to counter 112 and starts the counting process. The value of counter 112 is latched or otherwise read for each of the subsequent trigger thresholds reached as indicated by the corresponding detector outputs 111 (e.g., $th_2$, $th_3$, ... $th_N$). In this way, the signal levels of the envelope signal 109 are characterized. Each read counter value can be stored, for example, in control logic module 114. Alternatively, counter 112 may have a storage facility integrated therein for storing the read counter values.

In one embodiment, counter 112 has 64 sequential counter states (e.g., 6 bit counter), and buffer 116 can hold up to 64 x-bit samples of the original input signal, where x is the resolution of the analog-to-digital converter that produced digital input signal 102. In such an embodiment, each counter state corresponds to a particular buffer location. The advancing of counter 112 and the loading of buffer 116 are synchronized by the clock signal 104. The number of counter states and the number of buffer samples can be equal, but need not be so long as each buffer location can be uniquely identified by a particular delay signal index 124. A greater number of counter states and buffer samples can be used for detection when there is an input data signal with a longer rise-time (or fall-time). Likewise, a smaller number of counter states and buffer samples can be used when detecting a shorter rise-time (or fall-time).

Clock signal 104 may have the same frequency as the sampling frequency used by the analog-to-digital converter that produced the digital input signal 102. In alternative embodiments, clock signal 104 has a higher frequency than the sampling frequency of the analog-to-digital converter (e.g., clock signal 104 is twice the frequency of the sampling frequency).

Control logic module 114 receives the detector outputs 111. Each output 111 of the multilevel detector module 110 can be associated with a status flag. The corresponding status flag can be set in response to the associated detector output signal 111 being set by the multilevel detector module 110. Each output 111 can also be associated with a memory cell for storing the value of counter 112 in response to the associated detector output signal 111 being set by the multilevel detector module 110. The general detection flag 122 is set by the multilevel detector module 110 after a predetermined period of time expires. This predetermined period of time, which is generally referred to as the settling time of the signal detector, ranges from the time the initial threshold level was reached (as indicated by $th_0$) to a post-transition time (sometime after $th_N$ occurs).

Once the predetermined settling time has expired, control logic module 114 identifies the output 111 associated with the highest triggered threshold (e.g., as indicated by the status flags associated with each output 111). Control logic module 114 than identifies the relative time count information associated with the highest triggered threshold (e.g., as indicated by the memory cells associated with the lowest triggered threshold and the highest triggered threshold). Computation module 114a of control logic module 114 then calculates the signal delay index 124, which specifies the address of a location in buffer 116 containing the appropriate delayed version of the input signal 102.

Signal delay index 124 may be calculated as follows. The counter value stored in response to the initial threshold trigger being reached is subtracted from the counter value stored in response to the highest triggered threshold being reached. The resulting value essentially represents the detected transition period of the envelope signal 109 (as well as the transition period of input signal 102). This transition period is then subtracted from the predetermined settling time thereby producing signal delay index 124. Signal delay index 124 can then be provided to buffer 116, and used to identify the buffer location storing the sample of input signal 102 corresponding to the time when the highest triggered threshold was reached. This sample of input signal 102 is then provided as output signal 118. As such, the timing misalignment between the actual arrival of input signal 102 and indication of the input signal arrival is compensated for.

The functionality of control logic module 114 (including computation module 114a) may be implemented as a programmable logic device (e.g., state machine) or a function specific integrated circuit. Computation module 114a may be implemented, for example, with a discrete arithmetic logic unit (ALU) that performs arithmetic operations (e.g., to determine the signal delay index). Control logic module 114 (including computation module 114a) may alternatively be implemented by a microprocessor or a microcontroller.

Figure 1B:
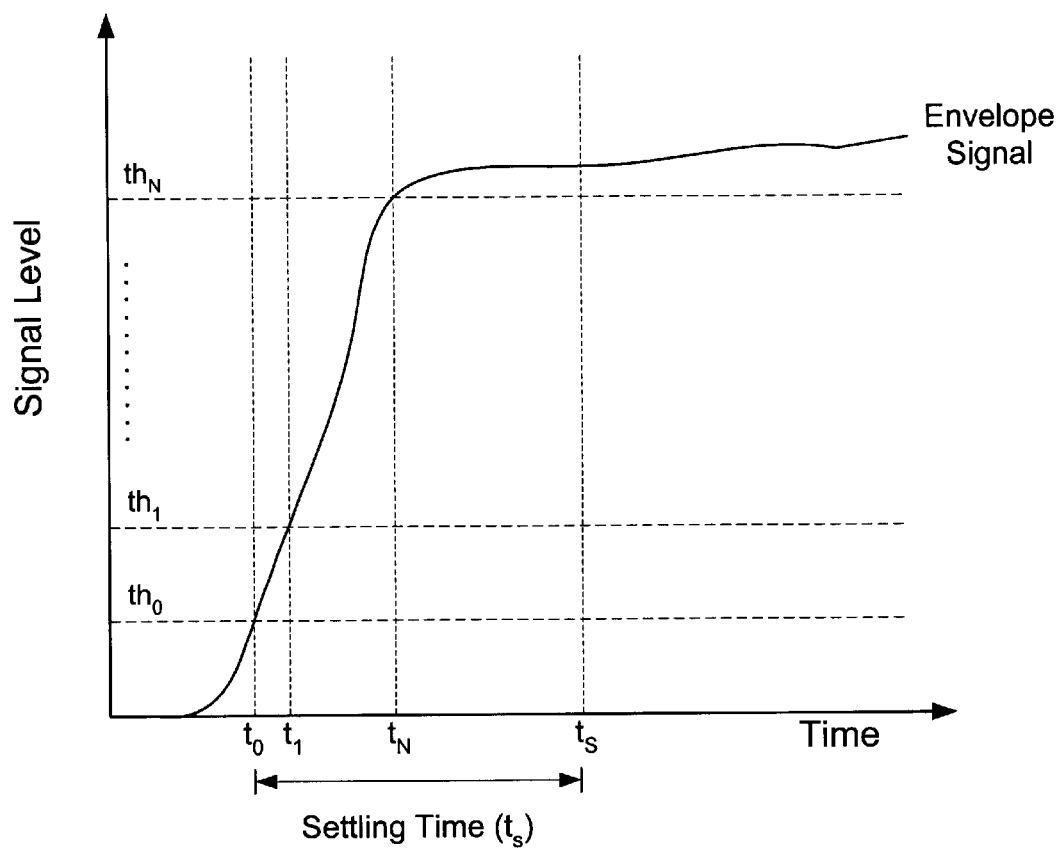
FIG. 1b illustrates a timing diagram showing transition points of a signal detected in accordance with one embodiment of the present invention.

FIG. 1b illustrates a timing diagram showing transition points of an envelope signal detected in accordance with one embodiment of the present invention. Assume that the multilevel detector module 110 includes eight distinct level comparators (e.g., comparator 0 through comparator 7) to detect a envelope signal. With this assumption in mind, note that $th_N$ of FIG. 1b is now $th_7$, and $t_N$ of FIG. 1b is now $t_7$. Envelope signal initially triggers threshold $th_0$ of comparator 0 at time $t_0$, which enables counter 112 to start counting. The starting value of the counter can be stored in a memory cell that is associated with comparator 0. Note that if the counter is initialized to some known value (e.g., 0000), then the count at $t_0$ need not be stored, as it is known.

At time $t_1$, the envelope signal triggers threshold $th_1$ of comparator 1 and the corresponding counter 112 value is saved in a memory cell that is associated with comparator 1. Alternatively, the delta count value between $t_1$ and $t_0$ can be calculated from their corresponding counts, and that delta time value can be saved in a memory cell associated with comparator 1. Note that if counter 112 is initialized to zero, there is no need to calculate a delta count. At time $t_7$, the envelope signal triggers threshold $th_7$ of comparator 7 and the corresponding counter 112 value is saved in a memory cell associated with comparator 7. Alternatively, the delta count value between $t_7$ and $t_0$ can be calculated from their corresponding counts, and that delta time value can be saved in a memory cell associated with comparator 1. Again, note that if counter 112 is initialized to zero, there is no need to calculate a delta count.

When counter 112 reaches its maximum value (which corresponds to the predetermined settling time, and is designated as $t_S$ in FIG. 1b), the comparators of multilevel detector module 110 can be disabled, and the control logic module 114 enabled. The control logic module 114 interrogates the status flags associated with each of the comparators of the multilevel detector module 110. The interrogation can be performed starting with the status flag associated with comparator 7 (the comparator having the greatest trigger threshold) and proceed in descending order until a set status flag is encountered thereby identifying the comparator having the highest triggered threshold. At this point, the control logic module 114 stops the descending interrogation of status flags. In the example shown in FIG. 1b, the greatest triggered threshold reached was $th_7$. Thus, the descending interrogation performed by control logic module 114 does not proceed to interrogate the status flag associated with comparator 6.

The control logic module 114 accesses the memory cell associated with the identified comparator having the highest triggered threshold, and retrieves the count (note that retrieved count may be a delta count as earlier explained) stored therein. The computation module 114a then calculates the signal delay index 124 by subtracting the retrieved count from the predetermined settling time $t_S$. The resulting signal delay index 124 corresponds to a memory location in buffer 116 that stores the sample of the input signal that was detected at $t_7$. This signal delay index 124 is provided to buffer 116, which retrieves the input signal sample corresponding to the address indicated by the signal delay index 124. This retrieved input signal sample is provided at output 118. Thus, a delayed version of the input signal is provided at the output 118 thereby compensating for timing misalignment.

Other envelope signals may not cross all of the given trigger thresholds. The above discussion equally applies to these other cases as well. For example, one envelope signal may only cross the trigger threshold $t_0$. In this case, the signal delay index 124 would be the predetermined settling time $t_S$ (e.g., the maximum counter value), which essentially represents the maximum signal misalignment that can be compensated for by the signal detector.

FIG. 1c illustrates a timing diagram showing a typical communication system input signal. Note that the signal has been digitized. Generally, the input signal is shown transitioning from an inactive state (e.g., idle mode) to an active state where communication is taking place. This input signal could be representative of input signal 102 of FIG. 1.

FIG. 1d illustrates a timing diagram showing the envelope signal of a typical communication system input signal. This envelope signal could be representative of envelope signal 109 of FIG. 1. Note the signal is crossing various threshold levels ($th_0$, through $th_N$). Threshold $th_0$ is crossed at $t_o$, threshold $th_N$ is crossed at $t_N$, and a number of intermediate thresholds are crossed between $t_o$ and $t_N$. The settling time $t_S$ occurs sometime after $t_N$.

FIG. 1e illustrates a timing diagram showing a detection flag signal in accordance with one embodiment of the present invention. This detection flag could be representative of detection flag 122 of FIG. 1. Note that the detection flag (sometimes referred to as a carrier sensing flag) indicates arrival of the detected input signal sometime after the input signal is actually received (as indicated by $t_R$ of FIG. 1c). As such, there is a timing misalignment between when detection of the input signal is indicated and when the input signal actually arrives. This timing misalignment can be calculated by $t_S - t_N$.

FIG. 1f illustrates a timing diagram showing a time adjusted output signal in accordance with one embodiment of the present invention. This output signal could be representative of output signal 118 of FIG. 1. The output signal is the delayed version of the input signal. More specifically, the output signal at $t_S$ does not correspond to the input signal at $t_S$. Rather, the output signal at $t_S$ does corresponds to the input signal at $t_R$. As such, the output signal is delayed by the calculated timing misalignment. Thus, the timing misalignment is compensated for.

Figure 2:
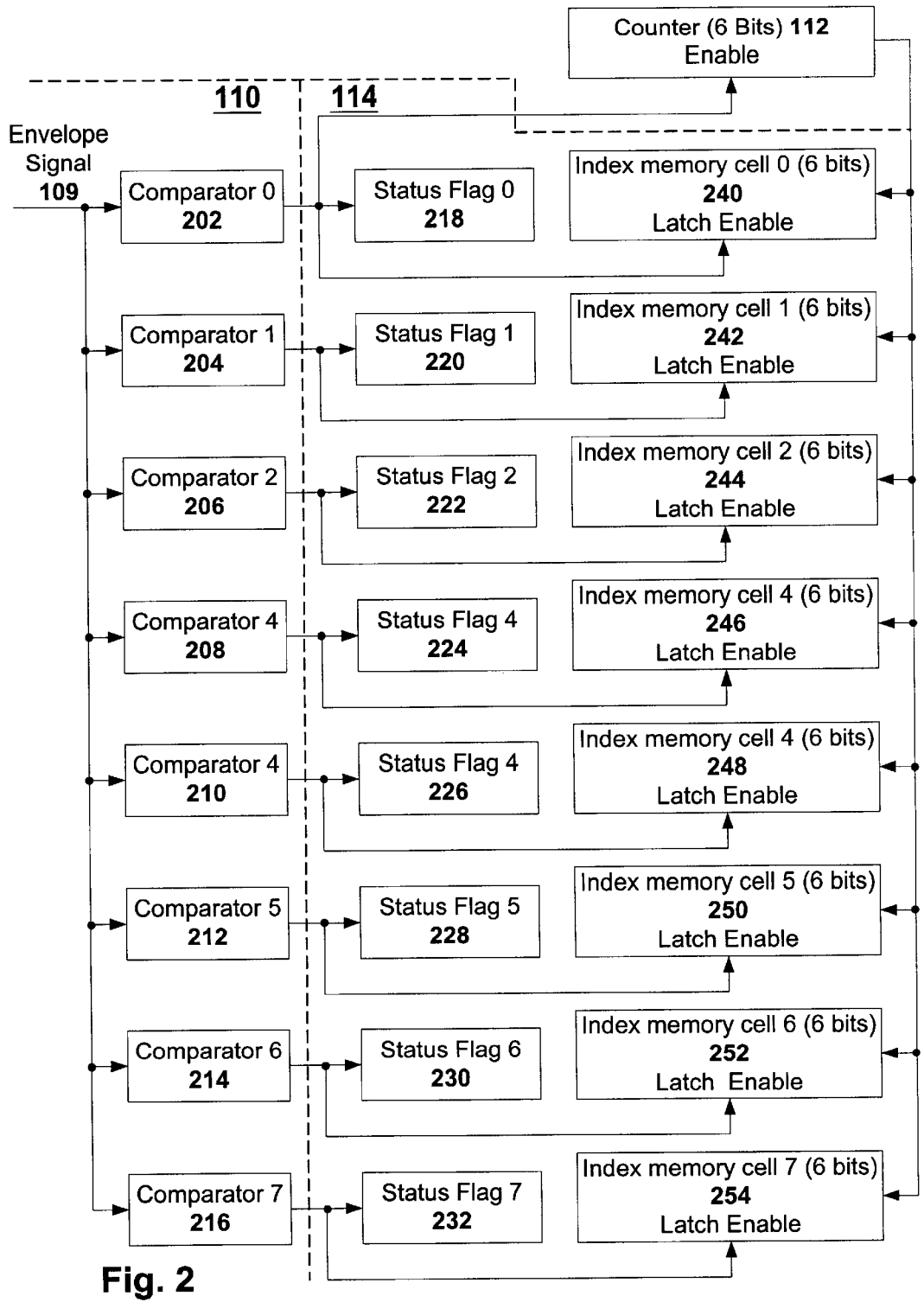
FIG. 2 illustrates a block diagram of a multilevel detector module and control logic and storage module in accordance with one embodiment of the present invention.

FIG. 2 illustrates a block diagram of a multilevel detector module 110 and control logic module 114 in accordance with one embodiment of the present invention. Note that other components not shown in FIG. 2 may also be included in the multilevel detector module 110 and the control logic module 114 as will be apparent in light of this disclosure. For example, control logic module 114 may also include a processing device such as an ALU or a microprocessor for calculating the signal delay index 124. Likewise, multilevel detector module 110 may also include buffers to store a flag indicating the corresponding threshold was reached.

In this embodiment, the envelope signal 109 is applied to the inputs of a number of comparators (e.g., comparators 202, 204, 206, 208, 210, 212, 214, and 216) included in the multilevel detector module 110. Each comparator outputs a trigger signal that sets a corresponding status flag (e.g., status flags 218, 220, 222, 224, 226, 228, 230, and 232) included in control logic module 114. The control logic module 114 also contains the a number of memory cells (e.g., memory cells 240, 242, 244, 246, 248, 250, 252, and 254). Each memory cell is configured to latch the count provided by counter 112 in response to a trigger signal being provided by the corresponding comparators. When a comparator trigger threshold is reached, a trigger signal is output thereby setting the corresponding status flag. In addition, the corresponding index memory cell is loaded with the current counter value.

Once the predetermined settling time $t_S$ has expired, the status flags of control logic module 114 can be interrogated to identify the highest triggered comparator as previously explained. The corresponding memory cell can then be read to get the time count specifying actual receipt of the signal that caused that highest level comparator to trigger. An ALU or other processing means (e.g., central processing unit or programmable gate level logic) can be used to determine the delay signal index 124 as previously explained. Note in the embodiment shown in FIG. 2 that counter 112 is a six bit counter, and the memory cells of control logic module 114 are adapted to latch a six bit counter reading in response to receiving a corresponding trigger signal. Other counter/memory cell configurations can be employed as well.

The discussion of the application of the present invention has mainly focused on detecting a rising input signal. However, the present invention can also be applied to detecting a falling input signal as will be apparent in light of this disclosure. For example, in an embodiment for detecting a rising input signal, the lowest level comparator provides an enable signal to start counter 112. In an alternative embodiment for detecting a falling input signal, the highest-level comparator would provide the enable signal to start the counter 112.

Figure 3:
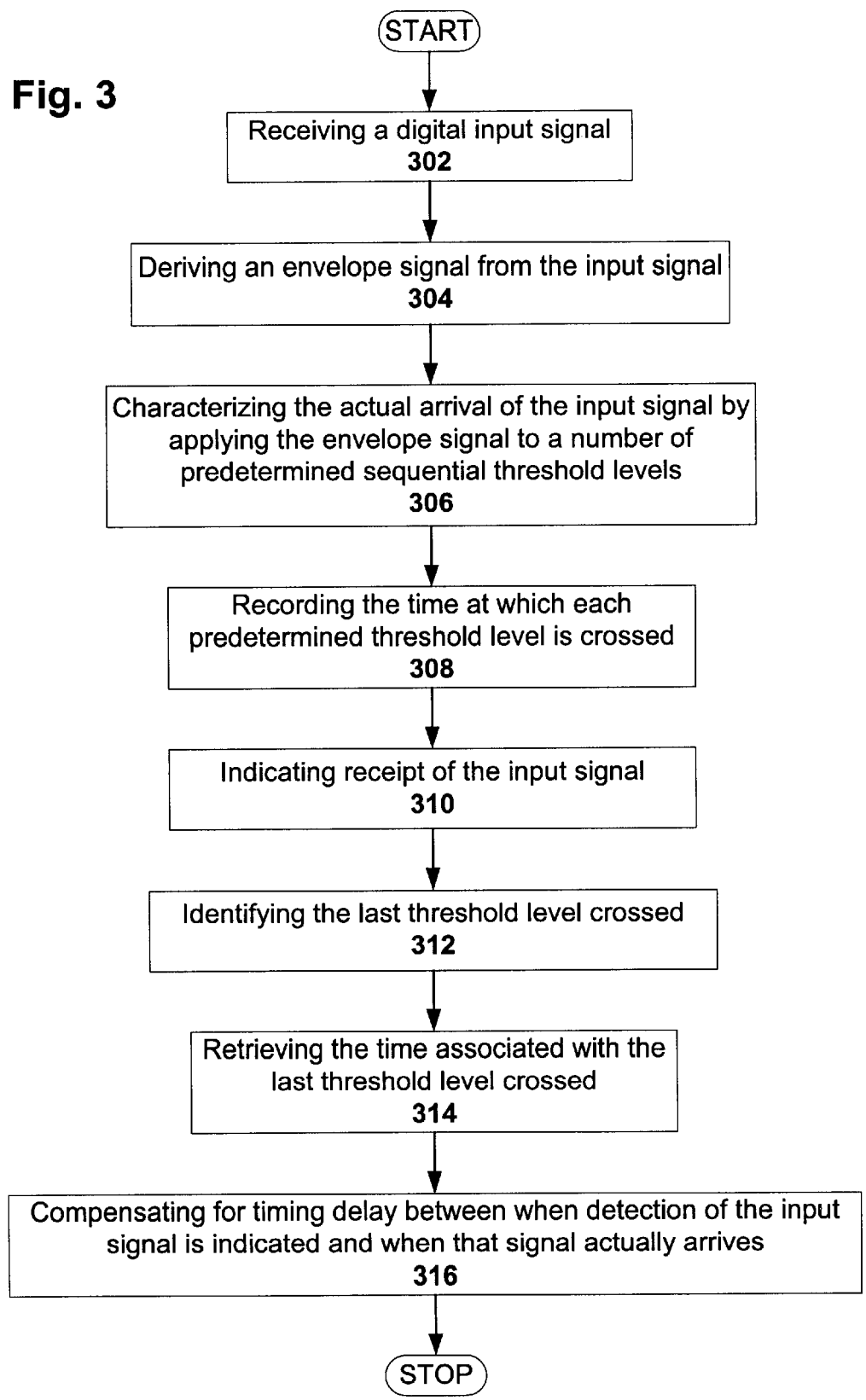
FIG. 3 illustrates a method for detecting a signal in accordance with one embodiment of the present invention.

FIG. 3 illustrates a method for detecting a signal in accordance with one embodiment of the present invention. The method begins with receiving 302 a digital input signal. The method proceeds with deriving 304 an envelope signal from the input signal. This step may be carried out, for example, by a conventional envelope detector configured to block out the DC components associated with the input signal. The method further includes characterizing 306 the actual arrival of the input signal by applying the envelope signal to a number of predetermined sequential threshold levels. This step may be carried out, for example, by the multilevel detector module 110 as described in reference to FIGS. 1 and 2. Note that one or more predetermined threshold levels may be crossed by the envelope signal. The method may further include recording 308 the time at which each predetermined threshold level is crossed. This step may be carried out, for example, by the control logic module 114 as described in reference to FIGS. 1 and 2.

The method may also include indicating 310 receipt of the input signal. This step can be carried out, for example, by setting a detection flag after a predetermined settling time $t_S$ expires (e.g., from $t_0$ to $t_S$ as shown in FIG. 1b). The method proceeds with identifying 312 the last threshold level crossed. The method may further include retrieving 314 the time associated with the last threshold level crossed. Recall that the last threshold level crossed can be either the lowest threshold level crossed or the highest level threshold crossed depending on whether the envelope signal is falling or rising, respectively. Steps 312 and 314 may be carried out, for example, by the control logic module 114 as described in reference to FIGS. 1 and 2.

The method includes compensating 316 for timing misalignment between when detection of the input signal is indicated and when that signal actually arrived (as indicated by the times associated with each threshold level crossed). This step may include calculating the timing misalignment by subtracting the time associated with the last threshold level crossed from the predetermined settling time, and delaying the input signal by the timing misalignment. This step may be effectively carried out, for example, by the control logic module 114 and buffer 116 as described in reference to FIGS. 1 and 2.

Figure 4A:
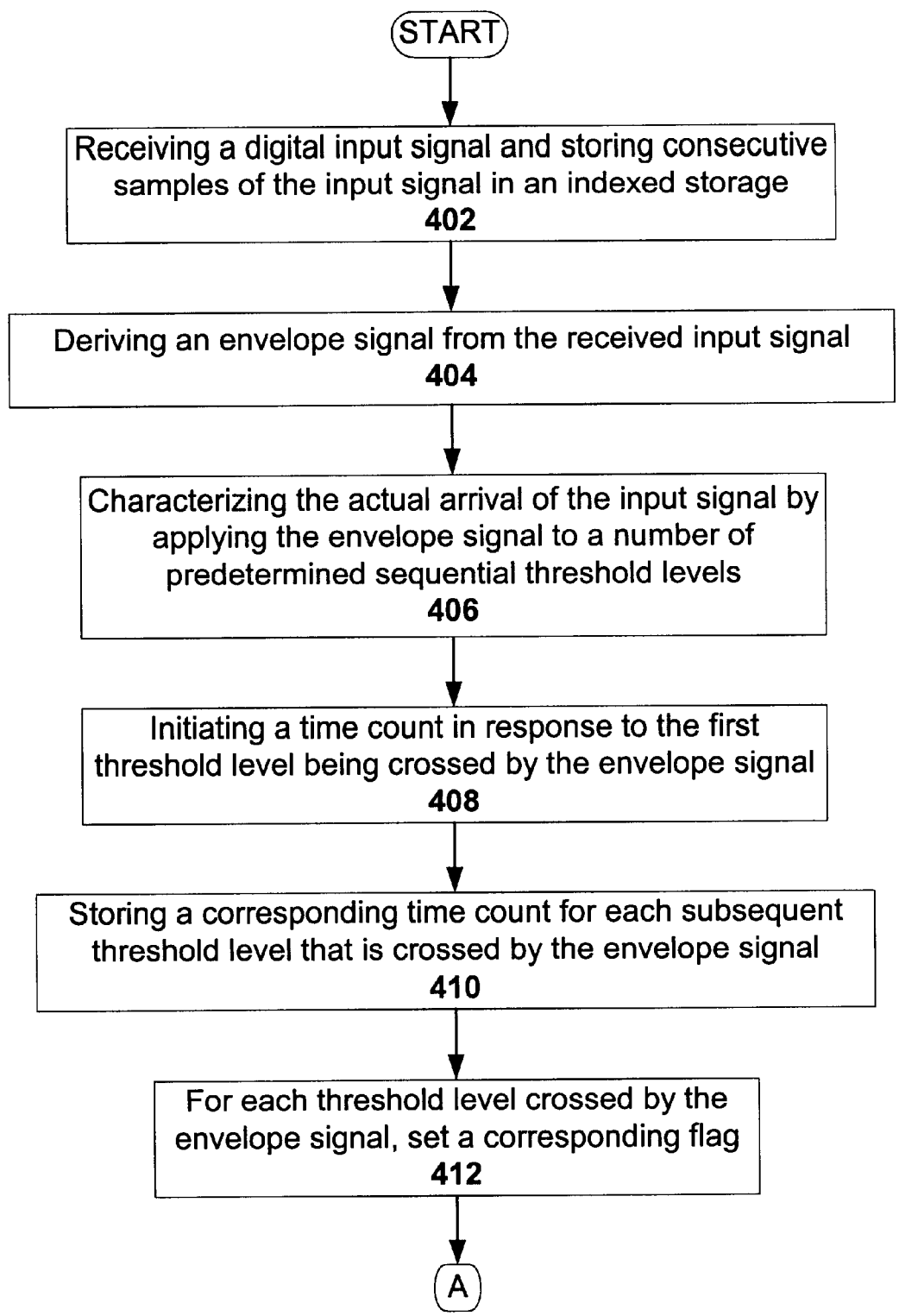
FIGS. 4a and 4b illustrate a detailed method for detecting an input signal at a transceiver in accordance with one embodiment of the present invention.

FIG. 4a illustrates a detailed method for detecting an input signal at a transceiver in accordance with one embodiment of the present invention. This method may be implemented, for example, using the signal detector described in reference to FIG. 1. The method begins with receiving 402 a digital input signal and storing consecutive samples of the input signal in an indexed storage. Each stored sample corresponds to a specific indexed location of the storage. The method proceeds with deriving 404 an envelope signal from the received digital input signal, and characterizing 406 the actual arrival of the input signal by applying the envelope signal to a number of predetermined sequential threshold levels.

The method continues with initiating 408 a time count in response to the first threshold level being crossed by the envelope signal. In one embodiment, the count is initialized to zero (e.g., 000000 binary) so that the count associated with the crossing of the first threshold level is zero. If the count is not reset to zero, then the initial count must be recorded so that it is available as a reference point for later counts. The rate of the count is synchronized with the indexed locations where the input signal samples are stored. As such, each of the indexed locations of the storage correspond to a particular count (or a count delta if initial count is a non-zero).

The method further includes storing 410 (or otherwise noting) a corresponding time count for each subsequent threshold level that is crossed by the envelope signal. This has the effect of time-stamping the signal levels associated with the envelope signal (as well as the input signal itself). For each threshold level crossed by the envelope signal, the method may further include setting 412 a corresponding flag. Such flags provide a mechanism that can be readily analyzed in determining what threshold levels have been reached by the envelope signal. Note that the setting of such flags can be done in parallel with other steps, such as the storing of time counts.

Figure 4B:
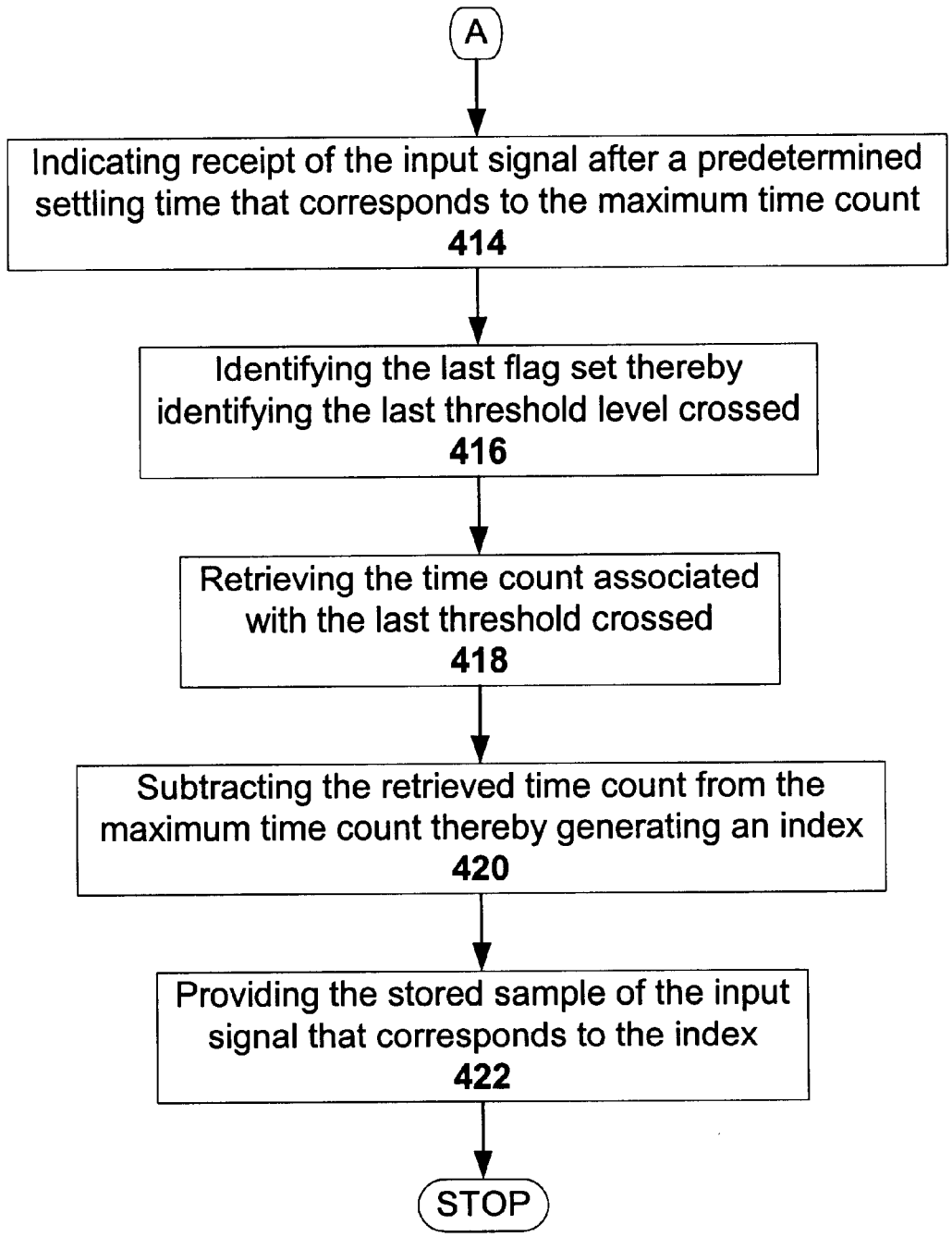

The method continues as shown in FIG. 4b, and further includes indicating 414 receipt of the input signal after a predetermined settling time that corresponds to the maximum time count. Note that the settling time begins when the first threshold level is crossed and continues for a predetermined amount of time. In one embodiment, the settling time is based on the desired number of samples of the digital input signal to be stored. For example, assume the sampling rate associated with the digital input signal is 64 samples/second. Further assume the indexed storage has 64 locations. The settling time would therefore be 1 second, as calculated by [(1 second/64 samples)*(64 samples)]. Having a sufficient number of samples ensures that a timing misalignment between indication of the input signal's arrival and its actual arrival can be compensated for. As such, the settling time determines the greatest timing misalignment that can be corrected.

The method proceeds with identifying 416 the last flag set thereby identifying the last threshold level crossed. Again, recall that the last threshold level crossed can be either the lowest threshold level crossed or the highest level threshold crossed depending on whether the envelope signal is falling or rising, respectively. As earlier explained, an ascending or descending interrogation of the flags can by systematically employed to efficiently carry out step 416. Whether ascending or descending interrogation should be used depends on factors such as the nature of the envelope signal (e.g., rising or falling), the anticipated input signal level, and the number of available threshold levels.

The method further includes retrieving 418 the time count associated with the last threshold crossed. This time count essentially marks the actual receipt of the input signal. The method proceeds with subtracting 420 the retrieved time count from the maximum time count thereby generating an index. This index corresponds to the storage location containing the sample of the input signal that is associated with the actual arrival of the input signal. The method further includes providing 422 the stored sample of the input signal that corresponds to the index. In this manner, the timing misalignment between when the arrival of the input signal was indicated and when the input signal actually arrived is compensated for.

Figure 5:
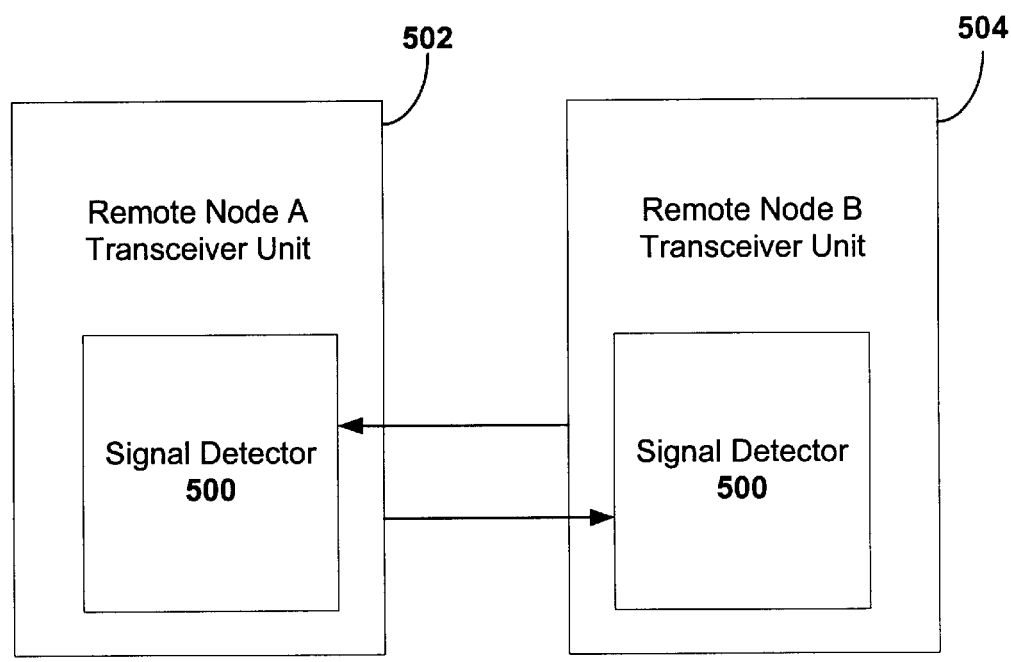
FIG. 5 illustrates a system employing transceivers having signal detectors in accordance with one embodiment of the present invention.

FIG. 5 illustrates a communication system employing signal detectors in accordance with one embodiment of the present invention. The system includes a remote node A transceiver unit 502 (e.g., central office transceiver) connected via a transmission line (e.g., a telephone line, or an equivalent connection) to a remote node B transceiver unit 504 (e.g., customer transceiver). The system can employ, for example, DSL-based technology to facilitate communication between the two nodes. In such an embodiment, a central office typically routes data from a customer transceiver to a DSL access multiplexer (DSLAM). Other configurations and applications will be apparent in light of this disclosure. Note that a transceiver employing a signal detector 500 in accordance with the present invention operates transparently to the other transceiver. Thus, one of the two communicating transceiver units might have a signal detector 500 in accordance with an embodiment of the present invention, while the other transceiver may have a conventional signal detector.

Alternative embodiments of the invention can be implemented in several environments and applications (e.g., homes and offices). The advantages of the present invention described herein also can equally be applied to such other environments and applications.

The foregoing description of the embodiments of the invention has been presented for the purposes of illustration and description. It is not intended to be exhaustive or to limit the invention to the precise form disclosed. Many modifications and variations are possible in light of the above teaching. For example, the principles and functionality of the present invention can be employed in transceivers and modems other than DSL-based modems, such as voice modems. It is intended that the scope of the invention be limited not by this detailed description, but rather by the claims appended hereto.

What is claimed is:

1. A method for detecting an input signal at a transceiver of a communication system, the method comprising:
    receiving the input signal;
    storing consecutive samples of the input signal, each stored sample corresponding to a specific indexed location;
    deriving an envelope signal from the input signal;
    characterizing actual arrival of the input signal by applying the envelope signal to a number of predetermined sequential threshold levels including a first threshold level;
    initiating a time count in response to the first threshold level being crossed by the envelope signal;
    storing a corresponding time count for each threshold level that is crossed by the envelope signal;
    indicating receipt of the input signal after a predetermined settling time that corresponds to a maximum time count;
    retrieving the time count corresponding to a last threshold crossed;
    subtracting the retrieved time count from the maximum time count thereby generating an index that specifies a location storing a sample of the input signal associated with the actual arrival of the input signal; and
    providing that sample of the input signal as the detected signal thereby compensating for timing misalignment between when receipt of the input signal was indicated and when the input signal actually arrived.

2. The method of claim 1, wherein the input signal is a digital equivalent of an analog communication signal.

3. The method of claim 1, wherein the time count is initialized to zero so that the time count associated with the first threshold level crossed by the envelope signal is zero.

4. The method of claim 1, wherein the time count is synchronized such that each of the indexed locations correspond to a particular time count.

5. The method of claim 1, further comprising:
    for each threshold level crossed by the envelope signal, setting a corresponding flag thereby indicating that the particular threshold level has been crossed; and
    identifying the last flag set thereby identifying the last threshold level crossed.

6. The method of claim 1, wherein the last threshold level crossed is one of the lowest threshold level crossed or the highest level threshold crossed.

7. The method of claim 1, wherein the predetermined settling time begins when the first threshold level is crossed, and has a duration that is based on a desired number of stored input signal samples.

8. The method of claim 1, wherein the time count associated with the last threshold level crossed corresponds to the actual arrival of the input signal.

9. The method of claim 1, wherein the last threshold level crossed and the first threshold level are the same, and the index is equal to the maximum time count.

10. A method for detecting an input signal at a transceiver of a communication system, the method comprising:
    characterizing actual arrival of the input signal by applying the input signal to a number of predetermined sequential threshold levels including a first threshold level;
    recording time at which each predetermined threshold level is crossed by the input signal;
    indicating receipt of the input signal after a predetermined settling time;
    identifying a last threshold level crossed, that last threshold level being associated with the actual arrival of the input signal; and
    compensating for timing misalignment between when the receipt of the input signal was indicated and when the input signal actually arrived.

11. The method of claim 10, wherein the input signal defines an envelope of a communication signal.

12. The method of claim 10, wherein the input signal is a digital equivalent of an analog communication signal.

13. The method of claim 10, wherein only one threshold level is crossed by the input signal and the timing delay is equal to the predetermined settling time.

14. The method of claim 10, wherein the step of indicating receipt of the input signal after a predetermined settling time includes setting a detection flag after the predetermined settling time expires.

15. The method of claim 10, wherein the last threshold level crossed is one of the lowest threshold level crossed or the highest level threshold crossed.

16. The method of claim 10, wherein the step of compensating for timing misalignment includes:
    calculating the timing misalignment by subtracting the time associated with the last threshold level crossed from the predetermined settling time; and
    delaying the input signal by the timing misalignment.

17. The method of claim 10, wherein the last threshold level crossed and the first threshold level are the same, and the timing misalignment is equal to the predetermined settling time.

18. A signal detector for detecting an input signal and compensating for timing misalignment between when receipt of the input signal is indicated and when the input signal actually arrives, the signal detector comprising:

a multilevel detector module having a number of predetermined sequential threshold levels including a first threshold level, the multilevel detector module adapted to indicate each threshold level crossed by the input signal;

a control logic module operatively coupled to the multilevel detector module, the control logic module adapted to time-stamp the input signal at each threshold level reached, and to indicate receipt of the input signal upon expiration of a predetermined settling time;

a memory operatively coupled to the control logic module for storing consecutive samples of the input signal, each stored sample corresponding to a specific indexed location of the memory; and a computation module operatively coupled to the control logic module and adapted to calculate an index based on the time-stamp associated with a last threshold level crossed and the predetermined settling time, the index specifying a location storing a sample of the input signal associated with the actual arrival of the input signal.

19. The detector of claim 18, wherein the control logic module is further adapted to identify the last threshold level crossed as indicated by the multilevel detector module.

20. The detector of claim 18, wherein the input signal defines an envelope of a communication signal.

21. The detector of claim 18, wherein the input signal is a digital equivalent of an analog communication signal.

22. The detector of claim 18, wherein a counter included in the control logic module is initialized to zero so that a time count associated with the first threshold level crossed by the input signal is zero.

23. The detector of claim 22, wherein the counter is synchronized such that each of the indexed locations of the memory correspond to a particular time count.

24. The detector of claim 18, wherein the control logic module is further adapted to set a corresponding flag for each threshold level crossed by the input signal thereby indicating that the particular threshold level has been crossed and to identify the last flag set thereby identifying the last threshold level crossed.

25. The detector of claim 18, wherein the last threshold level crossed is one of the lowest threshold level crossed or the highest level threshold crossed.

26. The detector of claim 18, wherein the predetermined settling time begins when the first threshold level is crossed, and has a duration that is based on a desired number of stored input signal samples.

27. The detector of claim 18, wherein the time stamp associated with the last threshold level crossed corresponds to the actual arrival of the input signal.

28. The detector of claim 18, wherein the last threshold level crossed and the first threshold level are the same, and the index is equal to the predetermined settling time.

* * * * *